United States Patent [19]  [11] 3,929,851
Atherton et al.  [45] Dec. 30, 1975

[54] PROCESS FOR PRODUCING HALOGENATED COMPOUNDS

[75] Inventors: John Heathcote Atherton; John Beckett Plumb; Ronald Sangster Stuart, all of Manchester, England

[73] Assignee: Imperial Chemical Industries Limited, London, England

[22] Filed: Jan. 23, 1974

[21] Appl. No.: 435,957

[30] Foreign Application Priority Data
Jan. 31, 1973  United Kingdom.................. 4766/73

[52] U.S. Cl. .................... 260/448.2 E; 260/448.8 R
[51] Int. Cl.² ......................... C07F 7/08; C07F 7/18
[58] Field of Search ............... 260/448.8 R, 448.2 E

[56] References Cited
UNITED STATES PATENTS
3,646,090  2/1972  Bennett .................... 260/448.2 E
3,689,519  9/1972  Lefort .................... 260/448.2 E

*Primary Examiner*—Paul F. Shaver
*Attorney, Agent, or Firm*—Cushman, Darby & Cushman

[57] ABSTRACT

A process for producing organosilicon compounds containing a halogen-substituted hydrocarbon group by reacting an organo-silicon compound having a hydrocarbonoxy-hydrocarbon substituent with a reagent such as hydrogen halide or a thionyl halide whereby the hydrocarbonoxy group is replaced by a halogen other than fluorine.

15 Claims, No Drawings

PROCESS FOR PRODUCING HALOGENATED COMPOUNDS

This invention relates to a new and improved process for the production of halogenated compounds and more particularly for the production of halohydrocarbyl organosilicon compounds.

Organosilicon compounds, for example, such as silanes and siloxanes having halohydrocarbyl groups are known and are of value in a variety of applications. These materials have hitherto been prepared by direct halogenation of, for example, a hydrocarbyl silane or siloxane. This process is unsatisfactory for several reasons. Thus the desired product is obtained in a very impure state and in a poor yield because of the occurence of other undesired reactions. In addition direct halogenation reactions are in general undesirable and to be avoided whenever possible.

We have now found that the aforesaid disadvantages can be avoided and the desired products obtained in a pure state and in high yield by a process of cleavage of the ether linkage in a suitable ether substituted silicon compound.

According to the present invention a process for the production of organosilicon compounds having at least one group XR- attached to silicon where X is a halogen and R is a divalent hydrocarbon group, comprises reacting an organosilicon compound having at least one group R'OR—, where R' is a hydrocarbyl group, attached to silicon, with a suitable reagent to replace the R'O group by halogen, other than fluorine.

Organosilicon compounds suitable for use in the process of our invention include those in which the group R' is an alkyl, aryl, alkaryl, aralkyl or cycloalkyl group. Suitable groups R' include, for example, methyl, ethyl, propyl, butyl, hexyl, dodecyl, phenyl, benzyl, tolyl and cyclohexyl groups. It is however, normally preferred that it be an alkyl group having not more than 10 carbon atoms. The organosilicon compounds may be, for example, silanes, siloxanes and organosilicon compounds containing the group $$\equiv Si - R'' - Si \equiv \qquad (I)$$

where $R''$ is a divalent hydrocarbon group free from aliphatic unsaturation and is preferably an alkylene or arylene group.

Suitable silanes include those of the general formula

(II)

where R and R' are as defined above, $R'''$ is a hydrocarbyl group, preferably a methyl or phenyl group, Y is a hydrolysable group, which is either resistant to the action of the reagent or is converted to halogen thereby and is preferably chlorine, bromine or an alkoxy group having not more than 4 carbon atoms, $p$ is 1, 2, 3 or 4, preferably 1, $q$ is 0, 1, 2 or 3 and $p + q$ is not greater than 4.

suitable siloxanes include those having at least one unit of the general formula:

(III)

wherein R, R' and $R'''$ are as defined above, $r$ is 1, 2 or 3, $s$ is 0, 1 or 2 and $r + s$ is not greater than 3. In general silanes of formula II and siloxanes having units of formula III are preferred.

The group R in the starting materials and in the products of our invention may be any divalent hydrocarbon group free from aliphatic unsaturation and is preferably a group of the general formula:

(IV)

the $CH_2$ group being directly attached to silicon, in which the $R^{IV}$ is hydrogen or a methyl group and $R^V$ is a divalent hydrocarbon group which may be aliphatic or aromatic or mixed aliphatic/aromatic but is preferably a linear or branched alkylene group and $a$ is 0 or 1. Groups $R^V$ of the general formula $-(CH_2)_n$ where $n$ is an integer from 1 to 30 are particularly preferred. Suitable groups R include, for example methylene, ethylene, 1,2-propylene, 1,3-propylene, 1,4-butylene 1,11-undecylene, p-phenylene ethylene and 3-(o-phenylene)-1-propylene. Preferred groups R are ethylene, 1,2-propylene, 1,3-propylene and isobutylene.

The organosilicon compounds, containing the group R'OR-bonded to silicon, used as starting materials, may be prepared in known manner. One method, for example, is the addition reaction of a compound containing silicon-bonded hydrogen to a terminally unsaturated compound. Thus in a preferred class the reaction is

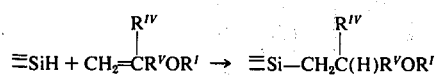

all of the symbols used having the same significance as before.

Suitable reagents for use in the process of our invention include, for example, hydrogen halides and thionyl halides. These include for example hydrogen bromide and thionyl chloride. Preferred reagents are hydrogen bromide and thionyl chloride.

The process may be carried out in the presence or absence of a solvent and is preferably carried out at an elevated temperature. Suitable solvents include, for example, aromatic hydrocarbons, for example, toluene. The process may however, conveniently be carried out at a temperature in the range from —20° to 250°C.

The products of our invention have a wide variety of uses, including uses as intermediates for the preparation of other compounds, for example, for preparation of organosilicon compounds having quaternary ammonium, phosphonium groups or sulphonium groups attached via an organic radical to silicon. Those products in which the group R is

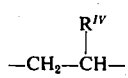

are especially useful as plant growth modifiers by virtue of their ability to release the olefine $CH_2 = CHR^{IV}$ on hydrolysis.

Our invention is further illustrated by the following Examples in which all parts are by weight.

EXAMPLE 1

5 parts of a polysiloxane having the average formula $Me_3SiO(MeHSiO)_{20}SiMe_3$, 5 parts of methylvinylether, 0.0167 part of bis(diethylsulphide) platinous chloride and 14.3 parts of toluene were heated at 100°C for 6 hours in a sealed container. Volatile materials were removed by distillation at 100°C and a pressure of 20 mm. Hg. There were thus obtained 9.25 parts of a brown oil having the average formula:

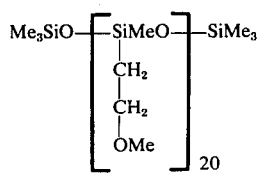

The structure of the product was confirmed by NMR spectroscopy.

2.5 parts of the methoxyethyl methyl polysiloxane prepared as described above, 3.1 parts of thionyl chloride, 30 parts of toluene and 0.05 part of stannic chloride were heated together under reflux for 15 minutes then cooled to 20°C. The toluene solution was washed with water, dried over anhydrous sodium sulphate and the solvent and other volatile material removed by distillation. There were thus obtained 1.7 parts of a light brown polysiloxane oil of average formula:

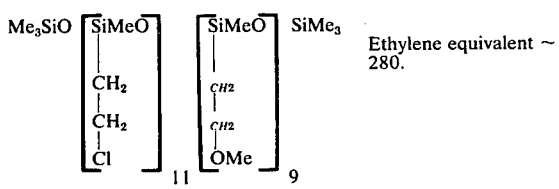

Ethylene equivalent ~ 280.

The NMR spectrum of the product was consistent with the above formula.

EXAMPLE 2

250 parts of isobutyl vinyl ether were added dropwise over a period of 90 minutes to a stirred refluxing solution of 0.1 part of bis(diethylsulphide)platinous chloride and 136 parts of a polysiloxane having the average formula:

$Me_3SiO(MeHSiO)_{20}SiMe_3$ in 215 parts of toluene.

Refluxing was continued for 30 minutes after the addition was complete, by which time no residual silicon-bonded hydrogen could be detected in the product by infra-red spectroscopy. Solvent was distilled off at 50 mm. Hg pressure up to a temperature of 105°C. There were thus obtained 326.4 parts of a brown oil having the average formula:

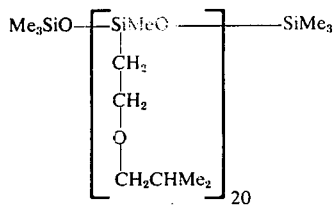

The structure of the product was confirmed by its NMR spectrum.

16.8 Parts of the isobutoxyethyl methyl polysiloxane prepared as described above were added over 10 minutes to a stirred solution of 13.1 parts of thionyl chloride and 0.3 part of stannic chloride. External cooling was used to keep the temperature of the reactants below 12°C during the addition of the siloxane. The temperature was then allowed to rise to 30°C and maintained at 25°–30°C for 2 hours. 71.4 parts of diethyl ether and 20 parts of water were added consecutively to the mixture which was then shaken for 5 minutes before separating and drying the ether layer. Removal of the ether and other volatiles by distillation gave 10.6 parts of a pale brown product having the average formula:

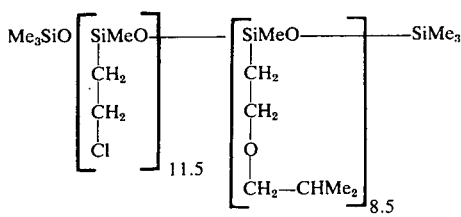

Ethylene equivalent 303.

The NMR spectrum of the product was consistent with the above formula.

EXAMPLE 3

18.1 parts of methyldichlorosilane, 9.2 parts of methylvinylether, 0.8 part of tributylamine and 0.02 part of bis(diethylsulphide) platinous chloride were heated at 90°C for 2 hours in a sealed container. Fractional distillation of the reaction product at atmospheric pressure gave 23.3 parts of methyl-2-methoxyethyldichlorosilane b.p. 151°C/753 mm.

Found: C,28.35; H, 6.18; Si, 15.7; Cl, 40.6% $C_4H_{10}Cl_2OSi$ requires: C, 27.73; H, 5.82; Si, 16.2; Cl, 41.0%.

10.0 parts of the methyl-2-methoxyethyldichlorosilane prepared as described above, 1.0 part of stannic chloride and 10.3 parts of thionyl chloride were heated together under reflux for 6 hours. The crude reaction product was shown by GLC analysis to contain approx. 7.6 parts of methyl-2-chloroethyldichlorosilane.

Fractional distillation of 11.7 parts of the crude reaction product at atmospheric pressure gave 6.2 parts of methyl-2-chloroethyldichlorosilane, bp. 154°–160°C, which was shown by GLC analysis to be at least 98% pure.

Found: neutralisation equivalent, 59.4; ethylene equivalent, 185; Cl (Volhard), 59.7%. Theory requires: neutralisation equivalent, 59.2; ethylene equivalent, 177.5; Cl, 60.0%.

EXAMPLE 4

A mixture of 402.5 parts of methyldichlorosilane and 350.0 parts of isobutylvinylether was added during 2 hours to a stirred, refluxing solution of 0.06 part of bis(diethylsulphide) platinous chloride in 26 parts of toluene. After the first 10 minutes a vigorous reaction occurred and the temperature of the reactants rose quickly to 120°C. The temperature was maintained at 120°–135°C by application of external heat during the remainder of the addition and for one hour thereafter. Distillation of the reaction product under reduced pressure gave 683.0 parts of pure methyl-2-isobutoxyethyldichlorosilane, b.p. 83°C/6 mm.

Found: C, 39.3; H, 7.59; Si, 12.65% $C_7H_{16}Cl_2OSi$ requires: C, 39.05; H, 7.49; Si, 13.0 %.

215.0 parts of the methyl-2-isobutoxyethyldichlorosilane prepared as described above, 238.0 parts of thionyl chloride and 30.0 parts of stannic chloride were heated together under reflux for 6 hours. The crude reaction product was decanted and flash distilled to remove tarry by products. Redistillation of the product under reduced pressure gave 94.7 parts of methyl-2-chloroethyldichlorosilane, bp. 50°C/11 mm., which was shown by GLC analysis to be at least 98% pure.

We claim:

1. A process for the production of organosilicon compounds having at least one group XR—, where X is a halogen other than fluorine and R is a divalent hydrocarbon group, attached to silicon which comprises reacting an organosilicon compound having at least one group R'OR—, where R' is a hydrocarbyl group, with a reagent consisting essentially of fluorine-free thionyl halides to replace the R'O group by halogen.

2. A process according to claim 1 wherein the group R' is selected from the group consisting of alkyl, aryl, alkaryl, aralkyl and cycloalkyl groups.

3. A process according to claim 1 wherein the group R' is an alkyl group having not more than 10 carbon atoms.

4. A process according to claim 1 wherein the group R' is selected from the group consisting of methyl, ethyl, propyl, butyl, hexyl, phenyl, benzyl, tolyl and cyclohexyl groups.

5. A process according to claim 1 wherein the organosilicon compound is a silane of the general formula:

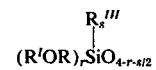

where R' and R''' are hydrocarbyl groups, R is a divalent hydrocarbon group, Y is a hydrolysable group selected from the group consisting essentially of chlorine, bromine and alkoxy groups having not more than 4 carbon atoms, $p$ is 1, 2, 3 or 4, $q$ is 0, 1, 2 or 3 and $p + q$ is not greater than 4.

6. A process according to claim 5 wherein R''' is selected from the group consisting of methyl and phenyl groups.

7. A process according to claim 5 wherein Y is selected from the group consisting of chlorine, bromine and alkoxy groups having not more than 4 carbon atoms.

8. A process according to claim 1 wherein the organosilicon compound is a siloxane having at least one unit of the general formula:

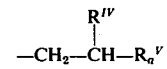

where R is a divalent hydrocarbon group, R' and R''' are hydrocarbyl groups, $r$ is 1, 2 or 3, $s$ is 0, 1 or 2 and $r + s$ is not greater than 3.

9. A process according to claim 8 wherein R''' is selected from the group consisting of methyl and phenyl groups.

10. A process according to claim 1 wherein the group R is a group of the general formula:

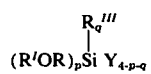

where $R^{IV}$ is selected from the group consisting of hydrogen and methyl groups, $R^V$ is a divalent hydrocarbon group and $a$ is 0 or 1.

11. A process according to claim 10 wherein $R^V$ is selected from the group consisting of linear and branched alkylene groups.

12. A process according to claim 11 wherein $R^V$ is a group of the general formula $-(CH_2)_n$ where $n$ is an integer from 1 to 30.

13. A process according to claim 10 wherein R is selected from the group consisting of ethylene, 1,2-propylene, 1,3-propylene and isobutylene groups.

14. A process according to claim 1 wherein the reagent is thionyl chloride.

15. A process according to claim 1 wherein the reaction is carried out at a temperature in the range from −20° to 250°C.

* * * * *